(Model.)
G. C. DE LAMETTER.
Fruit Drier.
No. 241,314. Patented May 10, 1881.
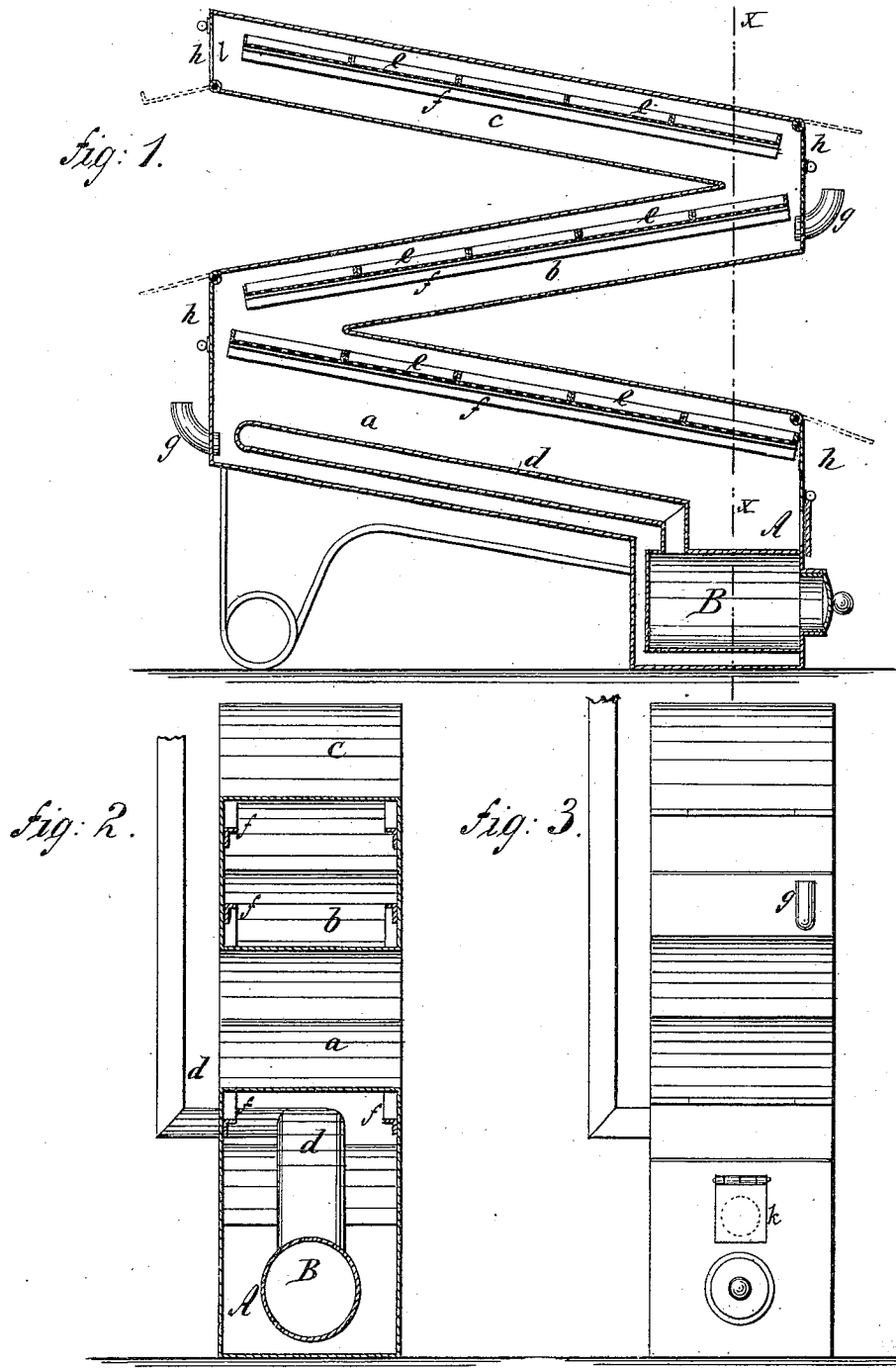
WITNESSES:
A. Schehl.
C. Sedgwick
INVENTOR:
G. C. De Lametter
BY Munn & Co.
ATTORNEYS.

UNITED STATES PATENT OFFICE.

GEORGE C. DE LAMETTER, OF NORTH WOLCOTT, NEW YORK.

FRUIT-DRIER.

SPECIFICATION forming part of Letters Patent No. 241,314, dated May 10, 1881.

Application filed March 1, 1881. (Model.)

*To all whom it may concern:*

Be it known that I, GEORGE C. DE LAMETTER, of North Wolcott, in the county of Wayne and State of New York, have invented a new Improvement in Fruit-Driers, of which the following is a full, clear, and exact description.

My improvements relate to apparatus for use in drying fruit, and have for their object, first, to obtain sufficient draft of heated air without the use of a blower, and, second, to prevent the fruit on the upper trays from being sweated by the damp air rising from below. At the same time my object is to furnish a simple, compact, and inexpensive apparatus.

The invention consists in certain novel features of construction and arrangement whereby the objects named are attained, as hereinafter described and claimed.

In the drawings, Figure 1 is a vertical longitudinal section of a drier embodying my inventions. Fig. 2 is a vertical transverse section on line $x\,x$ of Fig. 1, and Fig. 3 is a front elevation.

Similar letters of reference indicate corresponding parts.

A is a box, of suitable size, containing a heater, B, of any ordinary character.

From the back of the box A a trunk or flue, $a$, extends upward and backward, and connects with a reverse flue or trunk, $b$, which is also inclined, and trunk $b$, in turn, connects with a third inclined flue or trunk, $c$, thus forming a continuous back-and-forth passage from the box A. These inclined flues are of the full width of box A, and may be of any desired size and length, according to the capacity required. The inclination may vary, and should be sufficient to permit the natural rise of the heated air.

From the heater B a pipe, $d$, for escape of products of combustion, extends lengthwise of flue $a$, near the bottom and through the side of said flue.

In the flues $a\,b\,c$ are trays $e$, sustained on ledges $f$, that are fixed to the sides, near the upper part of the flues, so that the trays are held above the damp air, which naturally sinks to the bottom of each flue. At the upper ends of flues $a\,b$ there are outlet-pipes $g$, which pass out from near the bottom of the flues for allowing escape of the damp air. At the upper end of each flue there is a hinged door, $h$, through which the trays are to be inserted and removed.

In chamber A, a little above the door of heater B, is an inlet-opening to the flues, for the admission of air, provided with a door, $k$. At the farther extremity of the flue $c$ is an outlet-opening, $l$, for the exit of such air as has passed above the outlets $g$. By this means a constant current of hot air is created, whose force may be regulated by said door $k$.

It will be seen that the lower trays lie directly over the heater and its escape-pipe, so that the fruit there receives the greatest amount of heat. The hot air then passing upward acts on the upper trays in succession until the fruit is cured. The air becoming heavy with dampness in the first flue falls to the bottom and goes out by pipe $g$, so that only hot air passes to the flues above, from which the damp air there produced is also discharged in the same manner. The trays are to be removed from each flue as fast as the fruit is cured.

With this construction a large quantity of fruit can be treated at once, and the fruit on the upper trays is not liable to be sweated by damp air from below.

Having thus described my invention, what I claim as new, and desire to secure by Letters Patent, is—

In fruit-driers, the inclined flues or trunks $a\,b\,c$, placed one above the other and connected at opposite ends to form a continuous passage, provided with removable trays $e$ and outlet-pipes $g$, and fitted with heater B, all substantially as shown and described.

GEORGE COOK DE LAMETTER.

Witnesses:
 JOSEPH B. COSTERLINE,
 NATHANIEL J. FIELD.